United States Patent [19]

Ohlson et al.

[11] 4,421,826

[45] Dec. 20, 1983

[54] POLYURETHANE POLYMER AMINE SALT AS A DYEING AID, PARTICULARLY FOR POLYOLEFIN FIBERS

[75] Inventors: John L. Ohlson, Bedford; Irving E. Isgur, Framingham, both of Mass.

[73] Assignee: W. R. Grace & Co., Cambridge, Mass.

[21] Appl. No.: 361,317

[22] Filed: Apr. 15, 1982

Related U.S. Application Data

[63] Continuation-in-part of Ser. No. 147,781, May 8, 1980, abandoned.

[51] Int. Cl.$^3$ .................. B05D 5/04; C09B 65/00; D06M 15/12; D06P 3/79
[52] U.S. Cl. .......................................... 428/394; 8/554; 427/322; 427/389.9; 428/378; 428/392; 428/395; 428/423.7; 428/424.8; 428/425.6
[58] Field of Search .................. 8/554; 428/378, 392, 428/394, 395; 427/322, 389.9

[56] References Cited

U.S. PATENT DOCUMENTS

| | | |
|---|---|---|
| 3,308,206 | 3/1967 | Fordemwalt . |
| 3,594,114 | 7/1971 | Shmidl et al. . |
| 3,627,714 | 12/1971 | Marld . |
| 3,644,575 | 2/1972 | Nakatsuka et al. . |
| 3,695,915 | 10/1972 | Morris . |
| 3,711,571 | 1/1973 | Farah . |
| 3,846,378 | 11/1974 | Griswold . |
| 4,012,349 | 3/1977 | Matsuda et al. . |
| 4,014,645 | 3/1977 | Chancler et al. . |
| 4,016,120 | 4/1977 | Matsuda et al. . |
| 4,016,121 | 4/1977 | Matsuda et al. . |
| 4,087,243 | 5/1978 | Thomas et al. . |
| 4,098,933 | 7/1978 | Burkhardt et al. . |
| 4,131,422 | 12/1978 | Thomas et al. . |
| 4,149,849 | 4/1979 | Koch et al. . |
| 4,150,946 | 4/1979 | Neel et al. . |
| 4,171,404 | 10/1979 | Carroll . |

FOREIGN PATENT DOCUMENTS 49-13626 8/1974 Japan .

Primary Examiner—James C. Cannon
Attorney, Agent, or Firm—John J. Wasatonic; William L. Baker

[57] ABSTRACT

A polyurethane polymer amine salt is used as a dyeing aid by pretreating a woven or non-woven textile material containing at least partially or wholly synthetic textile materials or by incorporating a solution of the polyurethane polymer amine salt into the dyeing bath.

18 Claims, No Drawings

POLYURETHANE POLYMER AMINE SALT AS A DYEING AID, PARTICULARLY FOR POLYOLEFIN FIBERS

This application is a continuation-in-part of U.S. application Ser. No. 147,781, filed May 8, 1980, and now abandoned.

This invention relates to compositions and processes to impart improved dyeing properties to textile materials, particularly those woven and non-woven textiles wholly or partially containing synthetic fibers of polyester or polyolefins.

Most of the synthetic fibers and plastics used in the textile industry to produce textile materials, such as polyester fibers and polypropylene are colorless. In order to achieve the desired color or artistic and decorative effects, colorants are added to these materials. In the case of textile materials produced from synthetic fibers, such as polyester fibers, color is generally imparted to the materials through a dyeing process, such as dyeing with disperse dyes. However, when employing such dyeing process to impart color to a polyester material which is to be subsequently coated with a polymeric material such as plasticized polyvinyl chloride, problems have been encountered due to migration of the dyestuff from the dyed polyester into the polymeric coating.

Other methods, such as modification of polyester fibers, have been proposed heretofore to color textile materials produced from polyester fibers. For example, dope dyeings have been employed to produce colored polyester fibers. However, such dyeing techniques have not been generally acceptable because of the numerous manufacturing and handling problems. Other attempts have been made to chemically modify polyester fibers so that the fibers are dyeable by various dyes. However, the chemically modified polyester fibers so produced have suffered from the disadvantages of cost, availability and loss of strength.

Textile materials produced from polyolefin fibers, such as polypropylene, have been dyed by incorporation of dye receptive sites or dyestuff molecules into the polymer during polymerization. Such has generally been accomplished by copolymerization or grafting techniques. Another technique for imparting color to polyolefins has been to incorporate a predetermined amount of pigment into the polyolefin resin prior to melt extrusion of same.

While the above prior art methods have provided ways to dye or color synthetic fibers, such as polyester or polyolefin, problems have nevertheless been encountered. Such problems have been, in the case of polyester, severe crocking and migration of the dyestuff from the dyed fabric, especially when the fabric is coated with a polymeric material, such as plasticized vinyl. Further, in the case of polyolefins, such as polypropylene, severe limitations of color flexibility have been encountered resulting either in the necessity of large inventories of certain colored polyolefins or the use of the uncolored polyolefins.

Thus, new and improved polyester and polyolefin containing textile materials and methods of improving the dyeability of such textile materials which do not suffer from the disadvantage of the prior art materials and methods are constantly being sought.

This invention is based upon the discovery that certain waterborne polyurethane polymer amine salts can be used as a dyeing aid rendering difficult to dye materials dyeable. The particular polyurethane polymer amine salts are polyoxyethylene containing blocked polyurethane amine prepolymer salts. While this specification will be directed primarily to the dyeing of polypropylene fibers it is to be understood that other synthetic and natural materials may be dyed according to the composition and processes disclosed by this specification. Thus, when synthetic or polymeric materials are mentioned it is understood to mean, more particularly, polymeric materials such as polyolefins, polyesters and glass. The invention is especially valuable for dyeing polypropylene and polyesters.

In its broadest respect the invention comprises dyeing a woven or non-woven textile material containing partially or wholly a polymeric material by treating the textile material with a dyeing aid consisting essentially of a polyurethane polymer amine salt. In another broad aspect the invention comprises a woven or non-woven textile fabric containing partially or wholly synthetic fibers dyed in the presence of a dyeing aid comprising a cured polyurethane polymer amine salt. In a narrower instance the novel process comprises padding a woven or non-woven textile material containing partially or wholly synthetic fibers with a dilute aqueous solution of a particular polyurethane polymer amine salt, drying to remove the water, curing the salt to provide a fixed dye site in and on the textile material and dyeing the textile material in a conventional way.

In another posture it is contemplated that the polyurethane polymer amine salt dyeing aid may be dispersed in the dye bath without the necessity of a pretreated step.

The textile material treated in the presence of the polyurethane polymer amine salt will accept a dye from any dyebath such as direct dyebath, acid dyebath, disperse dyebath and vat dyebath.

As is apparent many of the available types of dyes can be used with the polyurethane polymine amine salt. The preferred dyes are fiber reactive dyes, acid dyes, direct dyes, disperse dyes and vat dyes.

Fiber reactive dyes are preferred for use in the process of this invention. They give the best performance, particularly where wash fastness is concerned. This specie is considered to be the most important one.

Reactive dyes are dyes capable of reacting with hydroxy, amino on mercapto groups. They are colored compounds which have a suitable group capable of forming a covalent bond between a carbon atom of the dye ion or molecule and an oxygen, nitrogen or sulfur atom of the hydroxy, amino or mercapto group, respectively, of a substrate.

Acid dyes contain, as the active principle, aromatic compounds that include in their chemical structure a chromophoric group and a water-solubilizing group. Usually the solubilizing group is the sulfonic acid radial, $—SO_3H$. Commercial acid dyes appear in the form of the sodium salt normally diluted to a standard effective concentrationwith an anhydrous sodium sulfate. The acid dyes may also contain as solubilizing groups either a carboxyl group or a hydroxyl group. Advantages of acid dyes for this application are that (a) they are quite soluble in a dilute solution (b) dilute solutions contain a relatively larger proportion of dye in the form of ions, simple molecules and simple micelles and (c) acid dyes have little or no affinity for pure cotton. Examples of acid dyes include Naphthol Yellow 5 XX (CI Acid Yellow 1); Phloxine GA (CI Acid Red 1); Brilliant Milling Red RRA (Cl Acid Red 89); Naphthol Green B (Cl Acid Green 1); Palatine Fast Orange RNA (Cl Acid Orange 72); Patent Blue AF Extra Congo (Cl Acid Blue 7); Violamine RD (Cl Acid Violet 9); Alizarine Saphirol B (Cl Blue 45); Wool Fast Blue BC (Cl Acid Blue 59); Quinoline Yellow AC (Cl Acid Yellow 3); etc.

Direct dyes (substantive dyes) are water-soluble dyes that exhaust onto cellulosic fibers, such as cotton, linen, and rayon, from a salt bath. Chemically, nearly all direct dyes are azo products containing one or more sulfonic acid radical, which imparts water solubility. A few also contain carboxyl groups ortho to hydroxyl, a configuration which permits after treatment for improvement of fastness. Some of the more important direct dyes include Congo Red (Cl Red 28); Diazo Blue Black RS (Cl Black 83); Trisulfon Brown B (Cl Direct Brown 31); Benzo Fast Blue R (Cl Direct Blue 63); Benzo Fast Blue B (Cl Direct Blue 30); Toluylene Red (Cl Red 46); Benzo Fast Yellow 5 GL (Cl Direct Yellow 44); Benzo Fast Pink 2BL (Cl Direct Red 75); Plutoform Black CAD (Cl Direct Black 22); and Chrysophenine Y (Cl Direct Yellow 12).

Disperse dyes are water-insoluble, colored organic substances which can be dispersed in water in very fine particle size. These dyes are divided on the basis of chemical structure into two main groups, the derivatives of 1,4-diamino- or 1,4,5,8-tetraaminoanthraquinones, and the p-aminomonoazo derivatives of aromatic or heterocyclic corresponds.

Vat dyes are water-insoluble organic substances that possess the unique property of being reducible in alkaline solution to a water-soluble form. The alkaline solution used to cause the reduction contains sodium hydrosulfite and caustic soda. Vat dyes are divided into two groups, the anthraquinone and the indigoid types. The anthraquinone type exhibit superior fastness properties and consequently is more widely used. Indigoid dyes have excellent fastness to washing and bleaching but may possess poorer fastness to light in many applications. One example of a vat dye is Anthroquinone Vat Yellow GK (Cl Vat Yellow 4).

It is contemplated that other types of dyes such as aniline black, diphenyl black, natural dyes, and mineral dyes may be used with the polyurethane amine salt dyeing aid under the correction conditions.

The novel polyurethane polymer amine salt dyeing aid is the subject of U.S. application Ser. No. 34,375 filed on Apr. 30, 1979 and, to the extent not provided for in this application the teaching of which is incorporated by reference herein.

The polyurethane polymer amine salt consists essentially of the reaction product of an NCO-terminated prepolymer blocked with an oxime, reacted with an amine and then further reacted with an acid whereby infinitely water dilutable waterborne polyurethane polymer amine salts are obtained.

As used throughout this application the term "waterborne" will indicate the state or condition of the amine salts of the amine reaction product with oxime blocked isocyanate prepolymers in an aqueous medium. It is not always apparent whether the polyurethane polymers in water are a microscopically heterogeneous mixture of two or more finely divided phases, i.e., liquid in liquid, and thus a dispersion or whether the polyurethane polymers are partially or wholly dissolved in the aqueous base and thus a solution.

We have observed the polyurethane polymers in water where the resulting product appears to be optically clear indicating a homogeneous solution. In this situation we believe that the individual molecules of polyurethane polymers are not bound together. On the other hand we have also observed polyurethane polymers in water where the resulting product is cloudy indicating a dispersion. Thus when used in this application the term "waterborne" will mean the novel amine salts in an aqueous system and may be either a homogeneous solution, a dispersion or any combination thereof.

In order to provide a satisfactory end product having adequate film forming characteristics it has been recognized that branched reactants must be included in the preparation of the water-borne polyurethane in order to get the necessary cross-linking to produce a three dimensional polymeric structure upon curing. Therefore it is understood throughout the following description that either the polyol, the polyfunctional amine, the prepolymer, a portion of each or any combination thereof shall have a reactive functionality greater than two.

The novel polyurethane polymer amine salt dye aid is made in four basic steps. First, a polyol is reacted with a polyisocyanate to prepare an NCO-terminated prepolymer. The prepolymer is blocked with an oxime in the second step. Third, the oxime blocked NCO-terminated prepolymer is reacted with one or more selected polyfunctional amines as hereinafter described. The amine reaction product is reacted with an acid. We have found that in order to obtain a product with useful properties that a reactant having functionality greater than 2 should be used in the first and/or third steps. Thus functionality of the NCO-prepolymer plus functionality of the polyfunctional amine will be greater than four.

It has been found that the reaction product of the polyfunctional amines with the oxime blocked NCO-terminated prepolymer tends to increase in viscosity with time until a complete gelation/setting up of the product occurs. Thus in another aspect it has unexpectedly been discovered that the gelation time and viscosity of the waterborne polyurethane polymer dispersion can be controlled and/or adjusted by the addition of a secondary amine to the reaction product.

The isocyanate capped polyoxyalkylene polyol, NCO-terminated prepolymer or urethane prepolymer useful in the invention are prepared by reacting polyoxyalkylene polyol with an excess of polyisocyanate, e.g., toluene diisocyanate. The polyol should have a molecular weight of from about 75 to about 20,000, and preferably from about 85 to 6,000. Wherever molecular weight is used in the present application it is to be understood that weight average molecular weight is meant. The hydroxyl functionality of the polyol and the corresponding isocyanate functionality following reaction is from 2 to about 8. When the isocyanate functionality of the prepolymer is two the functionality of the step 3 amine reactant must be greater than two. When the isocyanate functionality of the prepolymer is greater than two the functionality of the amine reactant in step 3 may be as little as two.

The preferred isocyanate capped or NCO-terminated prepolymer consists of a mixture of (1) an isocyanate capped hydrophilic polyoxyethylene diol, said diol having an ethylene oxide content of at least 40 mole percent; and (2) an isocyanate capped polyol having a hydroxy functionality in the range 3 to 8 prior to capping; said isocyanate capped polyol being present in an amount in the range 2.9 to 50% by weight of (1) and (2).

The polyoxyethylene diol is the reaction product of alkylene oxides of which at least 40 mole percent is ethylene oxide with an initiator such as ethylene glycol, propylene glycol, tetramethylene glycol, hexamethylene glycol or mixtures thereof. Preferably the molecular weight of the diol is between about 400 to about 6,000.

Examples of suitable polyols (to be capped with polyisocyanates) include: (A) essentially linear polyols formed, for example, by reaction of ethylene oxide with ethylene glycol as an initiator. Mixtures of ethylene oxide with other alkylene oxides can be employed so long as the mole percent of ethylene oxide is at least 40 percent. Where the linear polyethers are mixtures of ethylene oxide with e.g., propylene oxide, the polymer can be either random or a block copolymer. A second class of polyol (B) includes those with a hydroxy functionality of 3 or more. Such polyols are commonly formed by reacting alkylene oxides with a polyfunctional initiator such as trimethylolpropane, pentaerythritol, etc. In forming the polyol B, the alkylene oxide used can be ethylene oxide or mixtures of ethylene oxide with other alkylene oxides as described above. Useful polyols can be further exemplified by (C) linear branched polyfunctional polyols as exemplified in A and B above together with an initiator or crosslinker. A specific example of C is a mixture of polyethylene glycol (m.w. about 1,000) with trimethylolpropane, trimethylolethane or glycerine. This mixture can be subsequently reacted with excess polyisocyanate to provide a prepolymer useful in the invention. Alternatively, the linear or branched polyols, (e.g., polyethylene glycol) can be reacted separately with excess polyisocyanate. The initiator, e.g., trimethylolpropane, can also be separately reacted with polyisocyanate.

A preferred isocyanate terminated polyol prepolymer is prepared by mixing a hydrophilic polyoxyethylene diol having an ethylene oxide content of at least 40 mole percent with a polyol having a hydroxyl functionality in the range 3 to 8, said polyol being present in the admixture in an amount in the range 1.0 to 20% by weight, reacting with the mixture at a temperature in the range 0° to 120° C., an amount of a diisocyanate equal to 1.8-1.9 NCO to OH equivalents for a time sufficient to cap substantially all the hydroxyl groups of the admixture, adding additional diisocyanate to provide 0.1-0.3 equivalents of NCO per initial equivalent of OH in excess of the theoretical amount necessary to react with the hydroxyl groups.

Polyoxyalkylene polyol is terminated or capped by reaction with a polyisocyanate. The reaction may be carried out in an inert moisture-free atmosphere, such as under a nitrogen blanket, at atmospheric pressure with a temperature in the range of from about 0° C. to about 120° C. for a period of time of about 20 hours depending upon the temperature and degree of agitation. This reaction may be effected also under atmospheric conditions provided the product is not exposed to excess moisture.

Capping of the polyoxyalkylene polyol may be effected using stoichiometric amounts of reactants. Desirably, however, an excess of isocyanate is used to insure complete capping of the polyol. Thus, the ratio of isocyanate groups to the hydroxyl groups used is between about 2 to about 4 isocyanate to hydroxyl, and preferably about 2 to about 2.5 isocyanate to hydroxyl molar ratio.

To obtain the maximum strength, solvent resistance, heat resistance and the like, the isocyanate capped polyoxyalkylene polyol reaction products are formulated in such a manner as to give cross-linked polymer network.

Any ketoxime is effected. Among these are the preferred oximes, acetone oxime, butanone oxime, cyclohexanone oxime, and the like. An oxime based on a relatively volatile ketone is believed to be preferred. The most preferred oxime is butanone oxime, also commonly known as methyl ethyl ketoxime. Mixtures of oximes may be used. The proportions of oxime utilized may range from about 0.7 to about 1.2 equivalents of the isocyanate groups present. A more preferred range is 1.05 to 1.15 equivalents. Another way of expressing equivalents is on the basis of moles of reactive oxime and NCO groups involved, thus the NOH/NCO moles ratio which would be 0.7 to 1.2 which is the same as the range expressed in equivalents.

To prepare the blocked prepolymer, the oxime and prepolymer are simply admixed at temperatures of from 50° to 70° C. for from about ½ to 1½ hours. A solvent is not generally necessary although materials such as butyl cellosolve acetate can be employed. Other appropriate solvents include materials which are not reactive with either the oxime or urethane groups. Based on the moles of reactive oxime and NCO groups involved, the NOH/NCO molar ratio should be from about 0.7 to about 1.2 and preferably from about 1.05 to about 1.15. Generally it is most effective to use sufficient oxime to completely react with the NCO groups.

In preparing the blocked prepolymer the oxime is selected to provide a product that will undergo curing reactions in a reasonable time at a reasonable temperature. Numerous oximes and catalysts which can be employed are described in: Petersen, Liebigs Ann. Chem., 562 (1949), p. 215; Wicks, Progress in Organic Coatings, 3 (1975), pp. 73-99; and Hill et al, Journal of Paint Tech., 43 (1971) p. 55. Generally the oximes are aliphatic, cyclic, straight-chain or branched materials containing 2-8 (preferably 3-6) carbon atoms.

The oxime blocked, NCO-terminated prepolymer is reacted with an amine that is capable of causing the polymer to cure at a low temperature. Many of the amines usable are well know in the art and are referred to as polyfunctional amines. Specific examples of amines include, but are not limited to, bis(p-aminocyclohexyl)methane, ethylenediamine, 1,3 propanediamine, diethylenetriamine, triethylenetetramine, iminobispropylamine, tetraethylenepentamine, methyliminobispropylamine, 2(2-aminoethylamine)-ethanol, and the polyoxypropyleneamines manufactured by Jefferson Chemical Company, Inc., and sold under the tradenames JEFFAMINE D-400, D-2000 and T-403. The polyoxpropyleneamines are aliphatic polyether primary di- and tri-functional amines derived from propylene oxide adducts of diols and triols.

As can be observed from the amines listed, some of the amines can be represented by the general formulae, $NH_2—R'—NH_2'$ and $HO—R'—NH_2$, where $R'$ is a $C_2$ to $C_6$ group.

We have found in our experimental work that polyfunctional amines with a functionality of at least 2 primary amine end groups are the preferred amines for getting adequate curing of the polymer subsequently produced.

Some of the polyfunctional amines may be represented by the formula

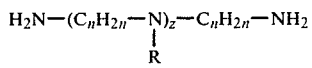

where z is an integer from 1 to 4; n is an integer larger than 1; and R is hydrogen, an alkyl group of 1 to 4 carbon atoms, or a hydroxyalkyl group of 1 to 4 carbon atoms.

The polyoxypropylene amines may be represented by the formula

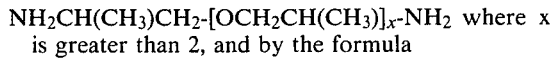 where x is greater than 2, and by the formula

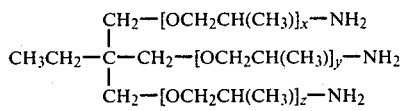

where $x+y+z$ is about 5.3. The molecular weights of these polyoxypropylene amines range from about 200 to 2000 or larger with the preferred polyoxypropylene amines having molecular weights of about 400 to 2000.

The amount of polyfunctional amine added to the oxime blocked NCO-terminated prepolymer should be in the range of about 0.6 to about 1.5 primary amine equivalents with the preferable range between about 0.9 to about 1.1 equivalents, based on the total equivalents of isocyanate groups present in NCO-terminated prepolymer.

Where the isocyanate functionality of the NCO-terminated prepolymer is two, a polyfunctional amine having a functionality of greater than two is required in order to provide a satisfactory crosslinked products. When the isocyanate functionality of the NCO-terminated prepolymer is greater than two, the polyfunctional amine functionality may be as little as two. It is to be understood from this that in the same reactive system that the functionality of the NCO-terminated prepolymer and the amine or polyoxypropylene amines will have a total functionality of greater than four.

The reaction between the oxime blocked prepolymer and the polyfunctional amine is controlled by adding an acid or a mixture of acid and water prior to the completion of the reaction. Failure to control the amine-oxime blocked prepolymer reaction at the proper time may result in an amine reaction product that is too viscous. Thus the proper portions of the blocked prepolymer and polyfunctional amine are placed in a reaction vessel and reacted under controlled conditions of heating and stirring. With experience we have been able to determine the state of the reaction by observing the increase in viscosity. With proper equipment, the reaction can be carried out more rapidly at elevated temperatures. For example, reaction times can be as short as about 3 minutes at about 95° C., 4 minutes at about 80° C., etc. Preferred reaction times are from about one-half hour to about one hour with temperatures between about 40° and 60° C. Sufficient acid or water-acid mixture is stirred into the amine reaction product to lower the pH value to about 5 or below.

The cationically stabilized waterborne polyurethane polymer amine salts are prepared by dispersing the amine reaction product in water in the presence of sufficient acid to provide a pH of from about 5 or less. In preparing the waterborne polymers, a concentrated acid solution can be added directly to the amine reaction product, admixed therewith and followed by dilution with water. This is the preferred method. However, it is also possible to first add the acid to the water followed by dispersion of the amine reaction product in the water.

It should be recognized that controlling the reaction between the oxime blocked prepolymer and polyfunctional amine by acid addition and providing the resultant amine salt reaction product in a waterborne state can be accomplished in separate steps, i.e., by sequential addition of acid and water to the reaction mixture, or in a single step, i.e., by simultaneous addition of the acid and water, either in separate streams or, preferably, as an aqueous acid solution.

When using the preferred isocyanate-terminated prepolymers of this invention prepared by isocyanate capping of a hydrophilic polyoxyethylene diol having a ethylene oxide content of at least 40 mole percent, blocking of substantially all of the isocyanate groups with the oxime is necessary to avoid formation of a non-dispersible foam upon the addition of water. It is believed that the high degree of hydrophilicity imparted to the prepolymer by the relatively high polyoxyethylene diol content results in a correspondingly high degree of water solubility and/or dispersibility in the prepolymer. These properties, in turn, result in an unacceptable degree of prepolymer-water reactivity which, without the aforementioned oxime blocking, results in foam formation upon addition of the water. The foam does not display the desired water-dispersibility or solubility and is not a film-forming material. Thus, the foam is substantially incapable of functioning as a dyeing aid of this invention. In contrast, the product produced from the oxime blocked prepolymer is a film-forming material which, due to the relatively high polyoxyethylene diol content, exhibits desired dispersibility or solubility properties in water. It should be understood that the combination of a film-forming capability and water dispersibility or solubility facilitates utilization of the amine salt reaction product as a dyeing aid. The capability of the product in facilitating dyeing of hard to dye fabrics, e.g. polypropylene, is believed to be attributable, at least in part, to these properties. Moreover, the water dispersibility or solubility of the dyeing aid polyurethane polymer is advantageous in permitting use of an aqueous medium during treatment or dyeing of a fabric, as opposed to the much less desirable use of an organic solvent medium.

It has been found that if the pH is not controlled within the broad range set forth above, settling problems are encountered and/or portions of the amine reaction product react with the water to form a crust. While the pH value range is to be considered, we have found that from about 1 to 10 parts by weight or more of acid may be used for each 100 parts by weight of amine reaction product. A more preferred range is from about 4 to 8 parts acid per 100 parts amine reaction product. These waterborne polymers have been found to be stable for periods of several months at ambient temperatures, e.g., 20° C., and also exhibit excellent resistance to freeze-thaw cycles.

While any organic or inorganic acid will form the amine salt and perform the function of controlling the pH value, the acids which we have used include glacial acetic acid, acrylic acid, citric acid, ethylenediaminetetracetic (EDTA) acid, formic acid, glycine (amino-acetic acid), hydrochloric acid, lactic acid (alpha-hydroxypropionic acid), orthophosphoric acid ($H_3PO_4$), phosphorous acid ($H_3PO_3$), sulfamic acid, sulfuric acid, tartaric acid (dihydroxysuccinic acid), paratoluenesulfonic acid and mixtures thereof.

Some of these acids, for example, sulfuric, hydrochloric and acetic acids tend to discolor. However, where other additives such as pigments and ultraviolet absorbers are added to the waterborne polyurethane, the tendency for discoloration by the acids may be masked by the additives. Through experimentation we have found that a blend of acetic and phosphoric acids seems to discolor less than other acids or combination of acids. Phosphoric acid alone provides good color stability.

It has been found that as little as about 2 to about 10% or more (non-volatile) polyurethane polymer amine salt in the treating bath may be used to condition the textile fabric to be dyed.

Further with regard to the dyeing properties of the polymers of this invention, it should be recognized that the polymer dyeing aids of this invention contain reactive end groups in the form of oxime blocked, unreacted NCO groups. Some degree of reaction between the end groups and the fiber-substrate which is to be dyed is believed to occur during curing of the polymer after deposition on the fiber. Thus, adhesion of the dyeing aid and, ultimately, of the dye to the fiber is facilitated. Curing of the polymer on the fiber can be accomplished by heating. Thus, as described in the following EXAMPLE, the prepolymer dyeing aid on polypropylene can be cured by heating at 150° C. for 2 minutes.

It will be appreciated that other additives such as ultraviolet absorbers, stabilizers, pigments, etc., may be formulated into the waterborne polyurethane polymers as required.

The following examples illustrate but are not limitative of our invention, it being understood that similar improved results are obtainable with other combinations of different components specified above. All such variations which do not depart from the basic concept of the invention and compositions disclosed above are intended to come within the scope of the appended claims.

EXAMPLE

Preparation of Polyurethane Prepolymer Amine Salt Dyeing Aid

The prepolymer was Hypol FHP 2000 (a product of W. R. Grace & Co.) which is the isocyanate (NCO) terminated product of a mixture of polyols. The prepolymer was prepared in accordance with U.S. Pat. No. 4,137,200, the teaching of which is incorporated herein by reference.

To 100 grams of the NCO terminated polyol prepolymer at 24° C. in a stainless steel vessel is added 22 grams of butanone oxime with stirring. The reaction of the oxime with the isocyanate is exothermic and the temperature goes to 60° C. A hot water bath is used to control the temperature between 80°–90° C. for twenty minutes.

After twenty minutes and the temperature at 90° C., 12 grams of diethylenetriamine is added with stirring. The reaction with the amine is also exothermic which accelerates chain extension.

The viscosity continues to increase and after ten minutes at 90°–95° C., 7.1 grams of glacial acetic acid and 7.1 grams of O-phosphoric acid dissolved in 100 grams of deionized water is slowly added to control the viscosity. After all the acid/water mixture is in, the material is cooled and packaged. Water may be added to achieve the desired % non volatiles (%N.V.) and viscosity.

Typical physical properties of the dyeing aid prepared as described are:

| | |
|---|---|
| % N.V. | 52.0 |
| pH | 4.5–6.9 |
| Viscosity (Brookfield LVF) | 600–1000 cps |
| Appearance | clear, straw colored solution |

For use as a dyeing aid, the solution would be further diluted with demineralized water to between about 2 to about 10% non-volatiles before treatment of the textile material.

An 8½-inch square piece of Testafabrics #976 Spun Polypropylene Fabric was weighed after conditioning and then was immersed in about 800 grams of impregnating solution in a rectangular Pyrex baking dish approximately 7"×9". After being throughly wet, the fabric was turned over and forced under the liquid to assure complete wet-out. The fabric was then drained for 10 to 30 seconds, placed between two pieces of blotting paper, squeezed once with an iron roller weighing about 50 pounds and hung vertically. After about one hour, the samples were dried at 120° C. for 15 minutes.

Curing was accomplished usually at 150° C. for 2 minutes although other times and temperatures have been used. Because polypropylene tends to shrink under these conditions, it was restrained in a embroidery hoop to maintain original size. A small amount of shrinkage was observed.

Table I shows typical urethane impregnation results. Three chemically different polyurethane amine salts were used at three concentrations.

Type 1 is the polyurethane polymer amine salt where the amine is diethylene triamine.

Type 2 is the polyurethane polymer amine salt where the amine is bis(p-aminocyclohexyl) methane.

Type 3 is the polyurethane polymer amine salt where the amine is Jeffamine T-403-a polyoxypropylene amine.

There is tendency to pick up more solution at a higher solids concentration and there is good correlation between the calculated pickup and that found. It is interesting that there is essentially no weight loss after the high temperature cure.

TABLE I

| PREPOLYMER TYPE | BATH % NONVOL. | BINDER PICKUP WET PICKUP (GMS.) | DRY PICKUP (GMS.) CALC. | DRY PICKUP (GMS.) FOUND | CURED PICKUP (%) |
|---|---|---|---|---|---|
| 1 | 3 | 2.48 | 0.07 | 0.07 | 1.88 |
|   | 5 | 2.52 | 0.13 | 0.11 | 3.15 |
|   | 8 | 3.28 | 0.26 | 0.29 | 7.57 |
| 2 | 3 | 2.52 | 0.08 | 0.10 | 2.86 |

TABLE I-continued

| PREPOLYMER TYPE | BATH % NONVOL. | BINDER PICKUP WET PICKUP (GMS.) | DRY PICKUP (GMS.) CALC. | FOUND | CURED PICKUP (%) |
|---|---|---|---|---|---|
| | 5 | 2.75 | 0.14 | 0.13 | 3.58 |
| | 8 | 3.08 | 0.25 | 0.27 | 7.44 |
| 3 | 3 | 4.19 | 0.123 | 0.08 | 1.98 |
| | 5 | 3.14 | 0.157 | 0.14 | 3.94 |
| | 8 | 3.16 | 0.253 | 0.26 | 7.16 |

DYEING

The dyeing of these cured fabrics was done according to the manufacturer's directions supplied with the dyes. All dyeing was done at 1% dye on the weight of the fabric except in those cases noted.

Acid Dyeing (DuPont's "Merpacryl Red G")

The total fiber weight was 33.58 grams.

The Merpacryl Red G dye bath was made adding 0.34 grams of Merpacryl Red G to 100 grams of demineralized water heated to boiling and stirring until dissolved.

The remainder of the dye bath was prepared by adding 0.2 grams Merpol DA[2] and 1.2 grams 86% formic acid to water and diluting to 500 grams with demineralizing water. This mixture was heated to 100° F., the urethane treated fabric added and left five minutes. The dye solution was then added to the bath and heating started. The temperature rose to 212° F. in 22 minutes and was held at around 200° F. for 60 minutes. The dye bath was almost completely exhausted. The fabric was removed and rinsed in running warm tap water. The final wash was with 0.5 grams Merpol DA[2] in 800 cc. water using vigorous hand agitation and washing for 15 minutes at 160° F. Warm tap water was used as the rinse and the samples were hung to dry.

Standard cotton pieces were used as a control in this experiment as well as with all subsequent experiments.

Direct Dyeing (Ciba/Geigy's Cuprophenyl Navy Blue RL 200%)

The total weight of polypropylene fabric was 26 grams. Into 100 grams of demineralized water was weighed 0.309 Cuprophenyl Navy Blue RL 200% and then heated to boiling. Into 500 grams of demineralized water 0.3 grams Merpol DA[2] was added and the solution heated to 120° F. when the fabric was added and stirred to wet out. The dyestuff solution was then added and heated to boil, then removed from the heat and 2 grams of salt added. After 5 minutes, another 2 grams of salt was added and after a further 2 minutes, the final 2 grams of salt was added. The solution was cooling down these additions. When the temperature reached 132° F., the fabric was rinsed 5 minutes in warm running tap water and some color washed out. The dyed fabric was scoured in 600 grams of tap water containing 0.3 grams Merpol DA[2] at 160° F. for 15 minutes. After rinsing in running tap water, the samples were hung to dry.

Basic Dye (Ciba/Geigy's Maxilon Red GRL)

The total weight of the polypropylene fabric was 28 grams.

The Maxilon Red GRL solution was made by adding 0.4 grams of dye to 100 grams demineralized water and heating to 140° F.

The remainder of the dye bath was made by adding 0.2 grams Merpol DA[2] and 2.0 grams formic acid to 500 grams demineralized water. After heating to 105° F., the fabric was added and then the dye solution. The heating rate was increased and the bath reached 210° F., in 25 minutes. After one hour at around 210° F., the fabric was rinsed with running hot water which removed a large amount of dye. The fabric was then scoured in 800 cc. water containing 0.5 g. Merpol DA[2] for one hour at 160° F., rinsed with warm water and hung to dry.

Disperse Dye (DuPont's "Lactyl" Blue BCN)

The total weight of polypropylene fabric was 30 g.

The dye solution was made by adding 0.3 grams of the dye to 100 g. of demineralized water and heating to 140° F. The remainder of the dye bath was prepared from 0.6 g. diammonium phosphate, 0.3 g. Merpol DA[2], 2 drops HAMPENE 100[3] and 0.15 g. 56% acetic acid. This solution was heated to 100° F. and the fabric added and run for 5 minutes. The dye solution was then added and the temperature increased immediately. The bath was boiling in 22 minutes and was run at or near the boil for one hour. The fabric was removed and rinsed in running warm tap water until the eluate was colorless. The fabric was then scoured in 800 cc. demineralized water containing 0.3 g. Merpol DA[2] for 15 minutes at 160° F. and then hung up to dry.

Reactive Dyes (Ciba/Geigy Cibacron Brilliant Red 4GE)

The total weight of polypropylene fabric was 33 grams.

A solution of Cibacron Brilliant Red 4GE made by adding 0.3 g. of dye to 100 g. of demineralized water and heating to 200° F.

To 500 g. of demineralized water, 0.15 g. of potassium tripolyphosphate was added and the temperature raised to 110° F. when 24 grams of solid salt were added at once and the fabric was added. The solution was then heated and reached 200° F. in 20 minutes when the dye solution was added. The dyebath was kept at 200° F. for 15 minutes and then cooled to 175° F. and 9 g. of trisodium phosphate was added. Dyeing was accomplished in 45 minutes at 175° F. The fabric was removed and rinsed twice with distilled water at 160° F. The dyed fabric was scoured in 800 g. of water containing 0.3 g. "Merpol DA"[2] at 200° F. for 15 minutes then rinsed in cold water and hung to dry.

Hoechst Dyes (Remazol Brilliant Blue R, Rhodazol Brilliant Green 5G)

Total weight of fabric was 30 grams.

To 400 grams of demineralized water at 90° F., 0.3 grams tetrasodium pyrophosphate was added and then dissolved the fabric was added. The 0.3 grams of dye was predissolved in 100 grams of demineralized water and added to the bath containing the fabric over 10 minutes. A total of 36 grams of sodium chloride was added in 10 minutes. Trisodium phosphate solution was then slowly added using 6 grams predissolved in 100 grams demineralized water. The temperature was then raised slowly to 120° F. during which time an additional 36 grams of salt were added. Dyeing was accomplished in 45 minutes at 120° F. The fabric was then rinsed with cold tap water, rinsed with warm water containing 1% of 56% acetic acid and finally with warm tap water. The fabric was then scoured in 1% "Merpol A"[1] at 200° F. for 15 minutes, then rinsed with warm tap water and finally rinsed with cold, slightly acid water before drying.

ICI Dyes

Procion Blue H-ERD

The dyebath was prepared by adding 0.3 g. dye to 600 g demineralized water along with 72 grams of sodium chloride. The 30 g. of fabric wasthen added and the dyebath was heated and maintained at 175° F. for 20 minutes. Sodium carbonate, 12 grams, was then added in portions over a ten-minute period. The pH of the bath at this point was about 10.5. The bath was kept at 175° F. for an additional 45 minutes and the fabric then rinsed with cold water. The fabric was scoured as above, rinsed in cold water and dried.

Procion Blue MX-2G

Dyeing could be carried out at lower temperatures and was as follows.

The dyebath was prepared by adding 0.3 g. Procion Blue MX-2G to 600 g. demineralized water along with 48 grams of sodiumchloride, then adding 30 grams of fabric. The dyebath was heated to 105° F. in about 20 minutes. Three grams of sodium carbonate was then added over a 15-minute period. The pH was about 10.5. Dyeing was continued at 105° F. for 45 minutes at which point the fabric was rinsed and scoured as above.

Results and Discussion

General

Although the urethane prepolymer coatings could be readily dyed with vat, reactive, acid, disperse and direct dyes, some of the dye was removed by washing, the amount depending essentially on the dye system used.

In a preliminary examination, the vat dye and the reactive dye were essentially wash-fast.

Reactive Dyes

Reactive dyes are thought to react with the hydroxyl groups in cellulose and in some cases with the amide hydrogens in a polyamide. The presence of reactive hydrogens in the urethane binder presents the possibilities of reaction at these sites and reaction does occur with the formation of a wash-fast dyed fabric. To date, we have used the Cibacron dyes of Ciba-Geigy; the Remazols and Rhodazols dyes of Hoechst; the Procion HE and Procion MXS of ICI.

It is known that the dyes of the various producers differ in their chemically reactive groups and, therefore, for a particular color one would expect differences between suppliers. This was, indeed, evident but all the dyes gave very acceptable color.

A range of colors has been used including reds, yellows, blues, greens, etc. These all dyed very well.

In most cases, the colors obtained on the urethane treated polypropylene were quite comparable to the colors obtained on standard cotton. In some cases, however, there is a difference in tint between the urethane treated polypropylene and the standard cotton. Thus, a green may show a yellowish-greenish hue on cotton while the urethane treated polypropylene seems to lack the yellow hue and is bluer if anything. Also, all the reactive dyes (colors) of one manufacturer do not react exactly the same with the urethane binder. As stated initially, in most cases the tints obtained are comparable but differences in depth of color are often observed. Sometimes, the cotton dyes to the deeper shade while with other dyes the urethane takes on the deeper shade. We hope to address the chemistry of these variations at a later date.

The dyed swatches have been tested for wash-fastness, resistance to U.V. light, gas oven resistance, etc.

Wash Resistance

Tables II through VI represent a minimal evaluation of test results of fabric samples treated with the 5% prepolymer bath and subsequently dyed with Cibacron Brilliant Orange 2GE, Procion Red HE3B, Remozol Brilliant Blue R and Procion MX3R Yellow, according to the procedure earlier described.

All tests were run in accordance with test methods of the American Association of Textile Chemists and Colorists (AATCC).

The wash resistance was determined according to Test Method 61, Colorfastness to Washing, is designed to approximate the results of five commercial or home launderings with respect to color loss and staining. The predictability of staining, however, is of questionable reliability and the results are included here for completeness only and should be viewed as such. Condition IIA approximates results of medium or warm wash settings, about 100° F., while Condition IVA approximates results at about 140° to 160° F. with chlorine present.

In Table II is presented a numerical comparison of the washed to unwashed fabric, with 5 representing excellent (no color loss), 4—good, 3—fair, 2—poor, and 1—very poor. The orange dye with Type 3 prepolymer shows very little loss of color on washing (4 and 4-5). This, of course, is due to the fact that there was very little dye pickup initially and, therefore, is not really meaningful.

The best results are observed for the Procion Yellow with Type 3 prepolymer which is good (4) under Conditions IIA and although it drops to fair (3) under Condition IVA, is comparable to the cotton control. Also, Procion Red with Type 1 prepolymer, which is fair (3) under both Condition IIA and Condition IVA. With the exception of the Remazol Blue dyed samples, all the samples demonstrated excellent resistance to staining under Condition IIA. Under Condition IVA, however, only the Procion Yellow in combination with each of the prepolymers shows good to excellent (5) resistance to staining, while Procion Red with Type 3 prepolymer also demonstrates excellent resistance to staining.

TABLE II

| | COLORFASTNESS TO WASHING | | | | |
|---|---|---|---|---|---|
| | | COLOR CHANGE | | STAINING | |
| DYE | BINDER | IIA | IVA | IIA | IVA |
| ORANGE | COTTON CONTROL | 4 | 3-4 | 5 | 4-5 (C.P) |

TABLE II-continued
COLORFASTNESS TO WASHING

| DYE | BINDER | COLOR CHANGE IIA | COLOR CHANGE IVA | STAINING IIA | STAINING IVA |
|---|---|---|---|---|---|
| | TYPE 1 | 2-3 | 2 | 5 | 2-3 (C) |
| | TYPE 2 | 2-3 | 2 | 4 (C)* | 3 (C) |
| | TYPE 3 | 4 | 4-5 | 5 | 4 (C) |
| RED | COTTON CONTROL | 4-5 | 4 | 5 | 3-4 (C) |
| | TYPE 1 | 3 | 3 | 5 | 3-4 (C) |
| | TYPE 2 | 3-4 | 2-3 | 4-5 (N) | 3-4 (N,C) |
| | TYPE 3 | 3-4 | 2-3 | 5 | 5 |
| BLUE | COTTON CONTROL | 4-5 | 4-5 | 4 (N) | 4 (N) |
| | TYPE 1 | 2-3 | 1-2 | 3-4 (N,A) | 2 (W,N) |
| | TYPE 2 | 3 | 2 | 4 (N,A) | 3 (W,N) |
| | TYPE 3 | 2 | 1-2 | 3-4 (N) | 2-3 (W,N) |
| YELLOW | COTTON CONTROL | 3-4 | 3 | 5 | 5 |
| | TYPE 1 | 3 | 2-3 | 5 | 4-5 (C) |
| | TYPE 2 | 3 | 2-3 | 5 | 4 (C) |
| | TYPE 3 | 4 | 3 | 5 | 5 |

*The letters in parentheses refer to the particular fabrics in a multifabric swatch that picked up color from the dyed fabrics when included in the wash bath. The fabrics are as follows:
C = Cotton
P = Polyester
N = Nylon
A = Acrylic
W = Wool The ratings given in Table III indicate almost all the samples exhibited excellent (5) resistance to crock under dry conditions. Although not quite as good when wet, they were rated mostly good (4) and usually equivalent to or slightly better than the cotton controls.

TABLE III
COLORFASTNESS TO CROCKING*

| DYE | BINDER | DRY | WET |
|---|---|---|---|
| ORANGE | COTTON CONTROL | 5 | 4-5 |
| | TYPE 1 | 5 | 4 |
| | TYPE 2 | 5 | 4 |
| | TYPE 3 | 5 | 5 |
| RED | COTTON CONTROL | 4 | 3-4 |
| | TYPE 1 | 4 | 4 |
| | TYPE 2 | 5 | 4 |
| | TYPE 3 | 5 | 4-5 |
| BLUE | COTTON CONTROL | 5 | 4 |
| | TYPE 1 | 5 | 4-5 |
| | TYPE 2 | 5 | 3-4 |
| | TYPE 3 | 5 | 4 |
| YELLOW | COTTON CONTROL | 4-5 | 4-5 |
| | TYPE 1 | 5 | 4 |
| | TYPE 2 | 5 | 4 |
| | TYPE 3 | 5 | 4 |

*AATCC, Test Method 8, Colorfastness to Crocking, measures the transfer of color from one fabric surface to another by rubbing.

Table IV show the fabric samples after exposure to the burnt gas fumes and the numerical evaluation of this test, respectively. We can see that the Procion Yellow dyed fabric with prepolymer Type 1 treatment is best with a rating of good to excellent (4-5) and equivalent to the cotton control. Several other specimens were rated from good to fair. Only the combinations with Remazol Blue were poor regardless of prepolymer type.

TABLE IV
COLORFASTNESS TO BURNT GAS FUMES*

| DYE | BINDER | COLOR CHANGE 1 Cycle | COLOR CHANGE 2 Cycles |
|---|---|---|---|
| ORANGE | COTTON CONTROL | 4 | 4 |
| | TYPE 1 | 4 | 4 |
| | TYPE 2 | 3 | 2 |
| | TYPE 3 | 2 | 1-2 |
| RED | COTTON CONTROL | 4 | 4 |
| | TYPE 1 | 3-4 | 3-4 |
| | TYPE 2 | 4 | 4 |
| | TYPE 3 | 1-2 | 1-2 |
| BLUE | COTTON CONTROL | 4 | 3 |
| | TYPE 1 | 2-3 | 2 |
| | TYPE 2 | 2-3 | 2 |
| | TYPE 3 | 2 | 1-2 |
| YELLOW | COTTON CONTROL | 4-5 | 4-5 |
| | TYPE 1 | 4-5 | 4-5 |
| | TYPE 2 | 3-4 | 3-4 |
| | TYPE 3 | 3-4 | 3-4 |

*AATCC, Test Method 23, Colorfastness to Burnt Gas Fumes, attempts to assess the resistance to atmospheric oxides of nitrogen relative to a test control fabric whose fading characteristics are well known. In this test, oxides of nitrogen were added to the gas flame to accelerate the test.

Table V shows the fabric samples after drycleaning and the numerical evaluation of this test, respectively. Procion Yellow with Type 1 or Type 2 prepolymer, which are rated fair (3) are the best results. You will note, the cotton control with this dye is only fair to good (3-4).

TABLE V
COLORFASTNESS TO DRYCLEANING*

| DYE | BINDER | CHANGE IN COLOR |
|---|---|---|
| ORANGE | COTTON CONTROL | 4 |
| | TYPE 1 | 1-2 |
| | TYPE 2 | 2 |
| | TYPE 3 | 3 |
| RED | COTTON CONTROL | 4 |
| | TYPE 1 | 1-2 |
| | TYPE 2 | 1-2 |
| | TYPE 3 | 3 |
| BLUE | COTTON CONTROL | 3 |
| | TYPE 1 | 2 |
| | TYPE 2 | 2-3 |
| | TYPE 3 | 2 |
| YELLOW | COTTON CONTROL | 3-4 |
| | TYPE 1 | 3 |
| | TYPE 2 | 3 |
| | TYPE 3 | 2-3 |

*AATCC, Test Method 132, Colorfastness to Dry Cleaning, gives an indication of the results to be obtained with repeated commercial drycleanings.

In Table VI is presented the colorfastness to light test. Colorfastness to light was measured at 5 hours, 10 hours, unexposed control, 20 hours, and 40 hours. Looking at the ratings for 40 hours, the combination of Procion Yellow and prepolymer Type 2 is fair to good (3-4) compared to only fair (3) for the cotton control, while the yellow with prepolymers 1 and 3 is also fair as is the Procion Red with prepolymer Type 3. At twenty hours, the Procion Yellow in combination with any of the prepolymers gives good (4) results while the cotton control is only fair and the red with prepolymer Type 3 is good (4) while the control is fair to good (3-4).

TABLE VI
COLORFASTNESS TO LIGHT*

| DYE | BINDER | HOURS 5 | 10 | 20 | 40 |
|---|---|---|---|---|---|
| ORANGE | COTTON CONTROL | 5 | 4 | 3 | 2-3 |
| | TYPE 1 | 3 | 2-3 | 2 | 1 |
| | TYPE 2 | 4 | 3 | 2-3 | 2 |
| | TYPE 3 | 1 | 1 | 1 | 1 |
| RED | COTTON CONTROL | 5 | 4 | 3-4 | 3 |
| | TYPE 1 | 3 | 2-3 | 1-2 | 1 |

TABLE VI-continued
COLORFASTNESS TO LIGHT*

| DYE | BINDER | HOURS | | | |
|---|---|---|---|---|---|
| | | 5 | 10 | 20 | 40 |
| | TYPE 2 | 5 | 4–5 | 3 | 1–2 |
| | TYPE 3 | 4–5 | 4–5 | 4 | 3 |
| BLUE | COTTON CONTROL | 5 | 5 | 4–5 | 4–5 |
| | TYPE 1 | 3–4 | 4 | 2–3 | 1 |
| | TYPE 2 | 4 | 3–4 | 2–3 | 1 |
| | TYPE 3 | 3 | 3 | 2–3 | 1–2 |
| YELLOW | COTTON CONTROL | 4 | 3 | 3 | 3 |
| | TYPE 1 | 4–5 | 4–5 | 4 | 3 |
| | TYPE 2 | 5 | 4–5 | 4 | 3–4 |
| | TYPE 3 | 5 | 4–5 | 4 | 3 |

*AATCC. Test Method 16E. Colorfastness to Light, uses the continuous light of water cooled Xenon Arc Lamp enclosed within filters to simulate the spectral distribution of unfiltered sunlight at sea level.

It is within the purview of the invention to include fillers and other materials that are substantially non reactive with the polyurethane polymer amine salt in the treatment of the synthetic fiber with the polyurethane polymer amine salt. Of course, carrier for the polyurethane polymer amine salt are also included. Materials that would react with the polyurethane polymers amine salt and substantially modify it are considered in this application to create compositions that by definition are no longer polyurethane polymer amine salt or the composition as described by its process of manufacture in this application or as described as a polyoxyethylene polyurethane amine prepolymer salt. Some dyes which are not so reactive as to inhibit adequate functioning of the polyurethane polymer amine salt with the fiber would be included within the purview of the invention when included during the initial treatment of the synthetic fiber.

It will be obvious to those skilled in the art that various changes and modifications may be made in the invention without departing from its true spirit and scope. It is, therefore, aimed in the appended claims to cover all such equivalent variations as fall within the true spirit and scope of the invention.

What is claimed is:

1. A process of treating a synthetic fiber comprising a polyolefin to impart improved dyeing properties thereto which comprises treating said synthetic fiber with a waterborne hydrophilic polyurethane polymer amine salt, said amine salt being prepared by a process comprising the steps of:
   (a) reacting an isocyanate capped hydrophilic polyol prepolymer comprising a mixture of from about 2.9 to about 50% by weight of said mixture of an isocyanate capped polyol having a hydroxyl functionality in the range of 3 to 8 prior to capping and from about 97.1 to about 50% by weight of said mixture of an isocyanate capped hydrophilic polyoxyethylene diol having an ethylene oxide content of at least 40 mole percent with from about 0.7 to about 1.2 equivalents of an oxime to block substantially all of the isocyanate groups of said prepolymer and provide an oxime blocked prepolymer;
   (b) reacting said oxime blocked prepolymer with a polyfunctional amine containing at least 2 primary amine functional groups to form an amine reaction product; and
   (c) supplying an acid and water to the reaction mixture of (b) after an increase in viscosity has occurred and prior to the completion of the reaction of said polyfunctional amine and oxime blocked prepolymer to form said waterborne polyurethane polymer amine salt, said water and said acid being added to said reaction mixture separately or as an aqueous acid.

2. The process according to claim 1 wherein the functional isocyanate groups per molecule of said prepolymer plus the functional amine groups and hydroxy groups per molecule of said polyfunctional amine total four or more.

3. The process according to claim 1 wherein said oxime is a ketoxime.

4. The process according to claim 3 wherein ketoxime is selected from the group consisting of acetone oxime, butanone oxime, cyclohexanone oxime and mixtures thereof.

5. The process according to claim 1 wherein said diol is the reaction product of alkylene oxides with an initiator selected from the group consisting of ethylene glycol, propylene glycol, tetramethyleneglycol, hexamethylene glycol and mixtures thereof and has a molecular weight between about 400 to about 6,000.

6. The process according to claim 1 wherein said polyol is the reaction product of alkylene oxides with an initiator selected from the group consisting of trimethylolpropane, pentaerythritol, glycerol and mixtures thereof and has a molecular weight between about 75 and about 20,000.

7. The process according to claim 6 wherein said molecular weight is from about 85 to about 6,000.

8. The process according to claim 1 wherein said polyfunctional amine is a mixture of diethylenetriamine and an amine selected from the group consisting of diethylamine, dibutylamine, dihexylamine, and mixtures thereof.

9. The process according to claim 1 wherein said ketoxime is butanone oxime, said polyfunctional amine is diethylenetriamine and said acid is chosen from the group consisting of glacial acetic acid, o-phosphoric acid and mixtures thereof.

10. The process according to claim 1 wherein said acid is an organic or inorganic acid selected from the group consisting of acetic, acrylic, citric, ethylenediaminetetraacetic, formic, glycine, hydrochloric, lactic, o-phosphoric, phosphorous, p-toluenesulfonic, sulfamic, surfuric, tartaric, and mixtures thereof.

11. The process according to claim 1 wherein said polyfunctional amine is selected from the group consisting of bis(p-aminocyclohexyl) methane, diethylenetriamine, triethylenetetramine, iminobispropylamine, tetraethylenepentamine, methyliminobispropylamine, 2(2-aminoethylamine)ethanol, ethylenediamine, 1,3-propanediamine, polyoxypropyleneamine, and mixtures thereof.

12. The process according to claim 1 wherein said polyolefin is polypropylene.

13. The process according to claim 1 wherein said fiber is treated by immersion in said waterborne polyurethane polymer amine salt.

14. The process according to claim 1 further comprising curing said polyurethane polymer amine salt after deposition on said fiber.

15. The process according to claim 14 wherein said curing is accomplished by heating said polymer.

16. The process according to claim 1 wherein said polyfunctional amine is reacted with said oxime blocked prepolymer in an amount of about 0.6 to about 1.5 primary amine equivalents, based on the total equivalents of isocyanate groups present in said isocyanate capped prepolymer.

17. The process according to claim 1 wherein said acid is supplied in sufficient amount to provide a pH of about 5 or less.

18. A treated fiber produced by the process of claim 1.

* * * * *